United States Patent [19]
Rubinstein et al.

[11] 4,042,828
[45] Aug. 16, 1977

[54] RACK FOR NUCLEAR FUEL ELEMENTS

[75] Inventors: Herbert J. Rubinstein, Los Gatos; Clark B. Gordon, San Jose; Albert Robison, Los Gatos; Philip M. Clark, San Jose, all of Calif.

[73] Assignee: Nuclear Services Corporation, Campbell, Calif.

[21] Appl. No.: 632,387

[22] Filed: Nov. 17, 1975

[51] Int. Cl.² .............................................. G21F 5/00
[52] U.S. Cl. ..................................... 250/507; 176/30; 176/87; 250/506
[58] Field of Search .................. 250/506, 507; 176/30, 176/87, 27, 28, 33

[56] References Cited
U.S. PATENT DOCUMENTS

| | | | |
|---|---|---|---|
| 3,431,170 | 3/1969 | Lass et al. | 176/87 X |
| 3,814,667 | 6/1974 | Klumb et al. | 176/30 X |
| 3,823,065 | 7/1974 | Jones | 250/506 X |

Primary Examiner—Archie R. Borchelt
Attorney, Agent, or Firm—Jack M. Wiseman

[57] ABSTRACT

A rack for storing spent nuclear fuel elements in which a plurality of aligned rows of upright enclosures of generally square cross-sectional areas contain vertically disposed spent fuel elements. Each fuel element is supported at the lower end thereof by a respective support that rests on the floor of the spent fuel pool for a nuclear power plant. An open rack frame is employed as an upright support for the enclosures containing the spent fuel elements. Legs at the lower corners of the frame rest on the floor of the pool to support the frame. In one exemplary embodiment, the support for the fuel element is in the form of a base on which a fuel element rests and the base is supported by legs. In another exemplary embodiment, each fuel element is supported on the pool floor by a self-adjusting support in the form of a base on which a fuel element rests and the base rests on a ball or swivel joint for self-alignment. The lower four corners of the frame are supported by legs adjustable in height for leveling the frame. Each adjustable frame leg is in the form of a base resting on the pool floor and the base supports a threaded post. The threaded post adjustably engages a threaded column on which rests the lower end of the frame.

16 Claims, 14 Drawing Figures

Fig_3

RACK FOR NUCLEAR FUEL ELEMENTS

BACKGROUND OF THE INVENTION

The present invention relates in general to the storage of nuclear fuel elements and more particularly to a rack for the storing of spent nuclear fuel elements in a pool for a nuclear power plant.

Heretofore, racks for nuclear fuel elements were formed from standard members, such as angle bars, I-beams, T-shaped members and channel members. Such racks were manufactured by General Electric Company, Combustion Engineering Company, Inc., PAR Systems, Speedway Machine and Tool Co., Inc., and others. Racks in which upright enclosures have fuel elements disposed therein and which form pockets for receiving high neutron absorbers are disclosed in a patent application filed by Herbert J. Rubinstein, et al., Ser. No. 595,444, filed July 11, 1975, for Rack For Storing Spent Fuel Elements and in a patent application filed by Herbert J. Rubinstein, et al., Ser. No. 612,533, filed Sept. 11, 1975, for Rack For Storing Spent Nuclear Fuel Elements. The assignee of the present application is also the assignee of the aforementioned patent applications.

The fuel racks sold by PAR, Programmed and Remote Systems Corp., of St. Paul, Minn. appear to employ jacks for the leveling of racks storing spent nuclear fuel elements, which appear to be disposed at the four corners of the rack.

In pools for nuclear power plants, the floor thereof is generally uneven due to the unevenness of the pool liner or the concrete floor below the pool liner. Notwithstanding, it is essential that the spent fuel elements in the rack be maintained in an upright position. Thus, the spent fuel elements preferably should not rest directly on the floor of the pool, since the floor of the pool is generally uneven. Additionally, the racks with the enclosures installed herein may have a tendency to be damaged during transportation and also are rather cumbersome to ship.

SUMMARY OF THE INVENTION

A rack for storing spent nuclear fuel elements in a pool for a nuclear power plant comprising a frame with upright enclosures for containing spent nuclear fuel elements. Each upright spent fuel element rests on a support which is disposed on the floor of the pool, while the frame retains the enclosure for the spent fuel element in the upright position.

A feature of the present invention is that there is an individual support for each fuel element.

Another feature of the present invention is that the support for each fuel element is self-aligning.

Another feature of the present invention is that the open rack frame rests on adjustable supports.

By virtue of the present invention, the spent fuel elements contained by the enclosures are supported in an upright position regardless of the uneven contour of the floor of the pool. The load of the fuel element is applied to the floor of the pool through the respective support, while the open rack frame does not bear any of the direct load of the fuel element. The open rack frame merely retains the enclosures in the upright position.

The spent fuel rack of the present invention can be shipped with facility and erected at point of installation. At the destination, the enclosures can be installed. Thus, damage during shipment has been reduced. By being of lighter weight, there is a lesser tendency for parts to be damaged.

Another feature of the present invention is the arrangement for securing frames together for obviating the need for welding or bolting without sacrificing rigidity.

DESCRIPTION OF THE PREFERRED EMBODIMENTS

Figure 1:
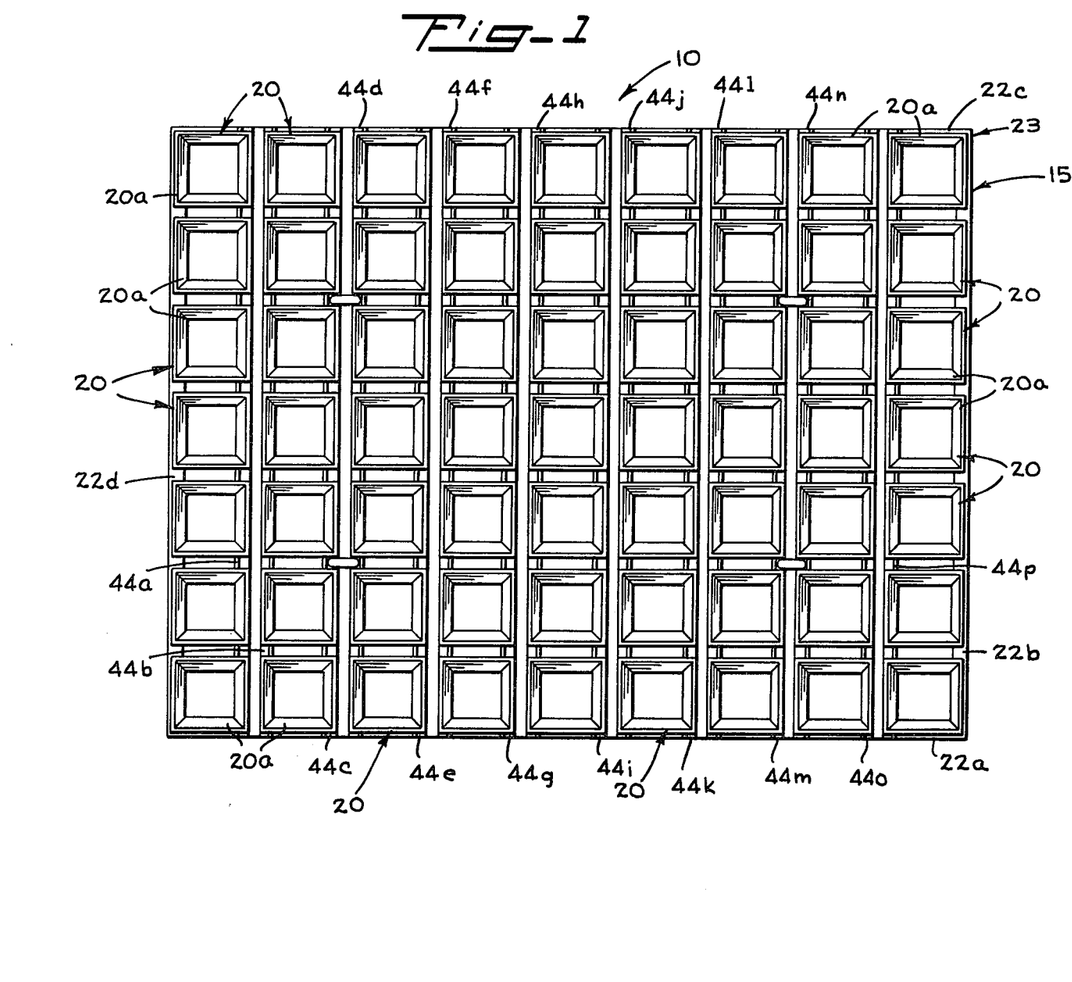
FIG. 1 is a plan view of a spent fuel rack embodying the present invention.
Figure 2:
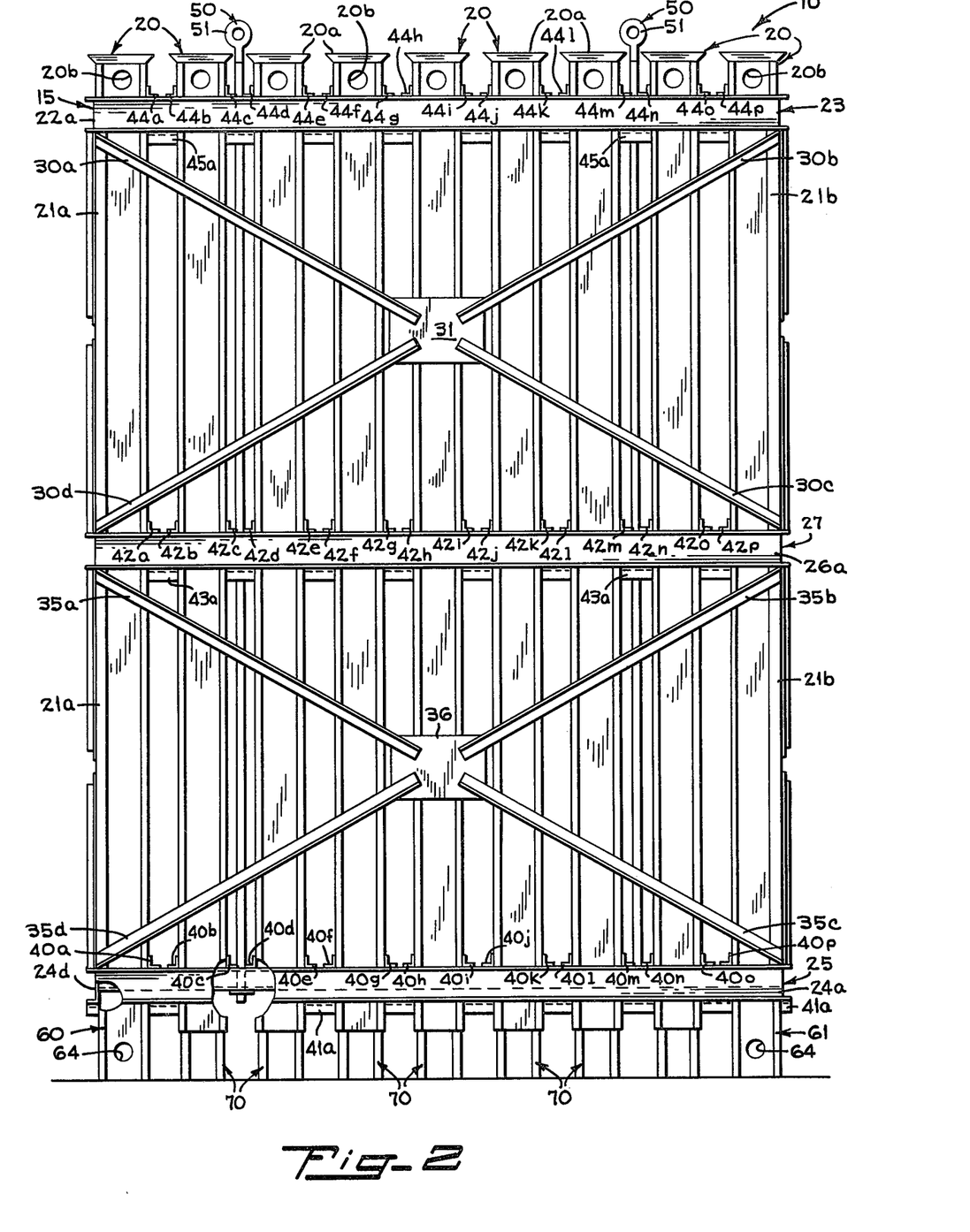
FIG. 2 is a side elevation view of the spent fuel rack shown in FIG. 1.
Figure 3:
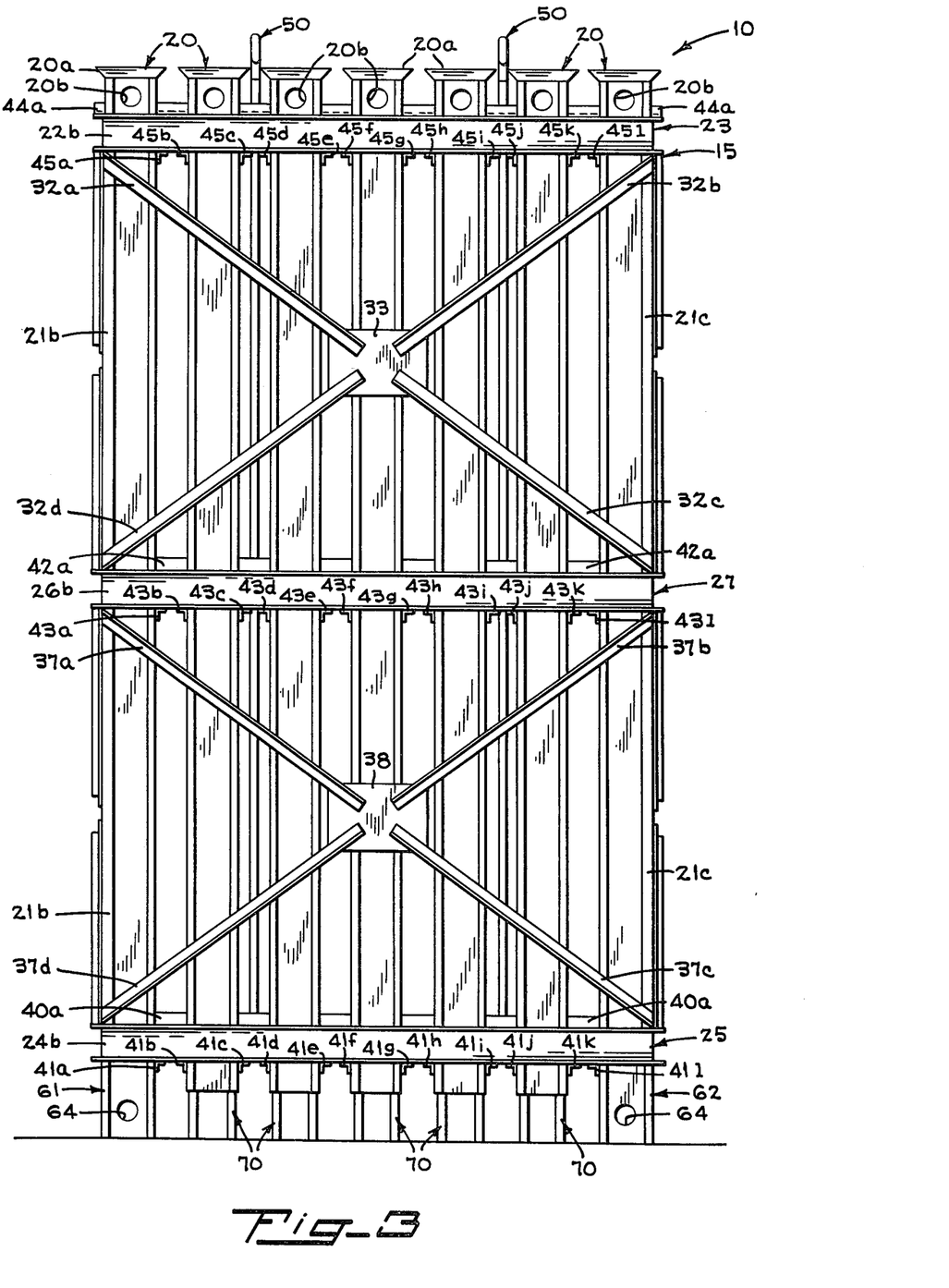
FIG. 3 is an end elevation view of the spent fuel rack shown in FIG. 1.

Illustrated in FIGS. 1-3 is a rack 10 for storing spent nuclear fuel elements embodying the present invention. In use, the rack 10 is disposed in a conventional spent fuel pool for a nuclear power plant. The pool contains water in which the rack 10 is submerged. The rack 10 comprises a stainless steel frame 15 and upright stainless steel enclosures 20 in which spent fuel elements are respectively disposed. The enclosures 20, which are welded to the frame 15, provide a shroud around the spent fuel elements to reduce the center-to-center fuel spacing. In the exemplary embodiment, there are nine parallel rows of the upright enclosures 20 and seven columns of aligned upright enclosures 20, as shown in FIGS. 2 and 3.

The frame 15 comprises four aligned upper and lower upright angle members, such as 21a–21c, located at the four corners of the frame 15. At the top of the angle members, such as angle members 21a–21c, are welded I-beams 22a–22d (FIG. 1) to form a horizontally disposed rectangularly-shaped top 23. At the lower portion of the angle members, such as angle members 21a–21c, are welded four I-beams, such as 24a, 24b and 24d (FIGS. 2 and 3) to form a horizontally disposed rectangularly-shaped base 25, which is parallel with and aligned with the top 23. Midway between the top 23 and the base 25, four I-beams, such as I-beams 26a and 26b, are welded to the four aligned upper and lower upright angle members, such as the angle channel members 21a–21c. the intermediate I-beams, such as I-beams 26a–26b, are horizontally disposed to form an intermediate rectangular structure 27, which is parallel with and aligned with the top 23 and the base 25. In the exemplary embodiment, the upright angle members, such as angle members 21a–21c, are respectively divided into two separate angle members separated by the intermediate I-beams, such as I-beams 26a–26b.

Confronting, parallel, diagonal angle-shaped braces 30a–30d (FIG. 2) with a center plate 31 (only one being shown in FIG. 2) and similar confronting, parallel, diagonal angle-shaped braces 32a–32d with a center plate 33 (only one being shown in FIG. 3) interconnect the top 23 with the intermediate structure 27. The braces 30a–30d and 32a–32d are welded to the upright angle members, such as the angle members 21a–21c. In a similar manner, confronting, parallel, diagonal angle-shaped braces 35a–35d with a center plate 36 (only one being shown in FIG. 2) interconnect the base 25 with the intermediate structure 27 and are welded to the angle members, such as the angle members 21a–21c. Confronting, parallel, diagonal angle-shaped braces 37a–37d with a center plate 38 (only one being shown in FIG. 3) interconnect the base 25 with the intermediate structure 27 and are welded to the upright angle members, such as the angle members 21a–21c.

To form the cavities for receiving the enclosures 20 (FIGS. 1 ∝ 3), respectively, the base 25 is formed with an array of parallel, transversely and horizontally disposed angle bars 40a–40p (FIG. 2), which are welded to the base longitudinal I-beams, such as I-beam 24a. Below the transverse bars 40a–40p is disposed an array of parallel, longitudinally and horizontally disposed angle bars 41a–41l (FIG. 3). The angle bars 41a–41l are at right angles to the angle bars 40a–40p and are welded to the base transverse I-beams, such as I-beam 24b of the base 25. The rectangular openings formed by the array of angle bars 40a–40p and the array of angle bars 41a–41l are dimensioned to accommodate the sizes of the respective upright enclosures 20.

In a similar manner, the intermediate rectangular structure 27 is formed with an array of parallel, transversely and horizontally disposed angle bars 42a–42p (FIG. 2), which are welded to the longitudinal intermediate I-beams, such as intermediate I-beam 26a. Below the transverse bars 42a–42p is disposed an array of parallel, longitudinally and horizontally disposed angle bars 43a–43l (FIG. 3). The angle bars 43a–43l are at right angles to the angle bars 42a–42p and are welded to the transverse intermediate I-beams, such as the I-beam 26b. The angle bars 42a–42p are aligned and parallel with the angle bars 40a–40p, respectively. Likewise, the angle bars 43a–43l are aligned with and parallel with the angle bars 41a–41l, respectively. The rectangular openings formed by the array of angle bars 42a–42p and the array of angle bars 43a–43l are dimensioned to accommodate the sizes of the respective upright disclosures 20.

Likewise, the top 23 (FIG. 2) is formed with an array of parallel, transversely and horizontally disposed angle bars 44a–44p, which are welded to the top longitudinal I-beams, such as the I-beam 22a. Below the transverse bars 44a–44p is disposed an array of parallel, longitudinally and horizontally disposed angle bars 45a–45l. The angle bars 45a–45l are at right angles to the angle bars 44a–44p and are welded to the top transverse beams, such as the I-beam 22b. The angle bars 44a–44p are aligned and parallel with the angle bars 40a–40p and 42a–42p, respectively. Likewise, the angle bars 45a–45l are aligned with and parallel with the angle bars 41a–41l and 43a–43l, respectively. The rectangular openings formed by the array of angle bars 44a–44p and the array of angle bars 44a–44p and the array of angle bars 45a–45l are dimensioned to accommodate the sizes of the respective upright disclosures 20.

Disposed in the aligned square openings of the top 23, the intermediate structure 27 and the base 25 are the respective upright enclosures 20 with square cross-sectional areas. In the exemplary embodiment, the inside dimensions of the cavities are 8⅜ × 8⅜ inch. The stainless steel enclosures 20 are not only structually rigid but also provide sufficient neutron absorption cross-section to allow close spacing of the spent fuel elements. The upper portion of each upright enclosure 20 (FIGS. 1 ∝ 3) has walls 20a defining a flared entry opening to assist in placing fuel elements into the enclosures 20. Each enclosure 20 is formed at the top on all for sides with suitable holes 20b to allow the passage and flow of water. In the exemplary embodiment, the holes 20b are 3 inches in diameter. The upper openings 20b provide a bypass flow in the event the upper end of the enclosures 20 are plugged by a foreign object.

Grappling rods 50 with eye-bolts 51 at the upper end thereof are bolted to the base 25 (FIG. 2). Suitable grappling hooks, not shown, operated by a suitable crane engage the eye-bolts 51 for the raising and lowering of the rack 10. At the four corners of the frame 15 below the base 25 are four feet, such as feet 60–62, which are disposed on the floor of the pool and which support the open rack frame 15. Each foot, such as feet 60–62, has a square cross-sectional area. Shims, not shown, may be employed between the bottom of the feet, such as feet 60–62, and the surface of the floor of the pool to stabilize and to support the frame 15 at an even height above the floor of the pool and to dispose the base 25, the structure 27 and the top 23 in horizontal positions. The feet, such as feet 60–62, are welded to the base I-beams, such as I-beams 24a–24b, of the base 25 and are formed with openings 64 in the four sides thereof for the passage of water. In the exemplary embodiment, the openings 64 are 3 inches in diameter.

Figures 4, 5, 6:
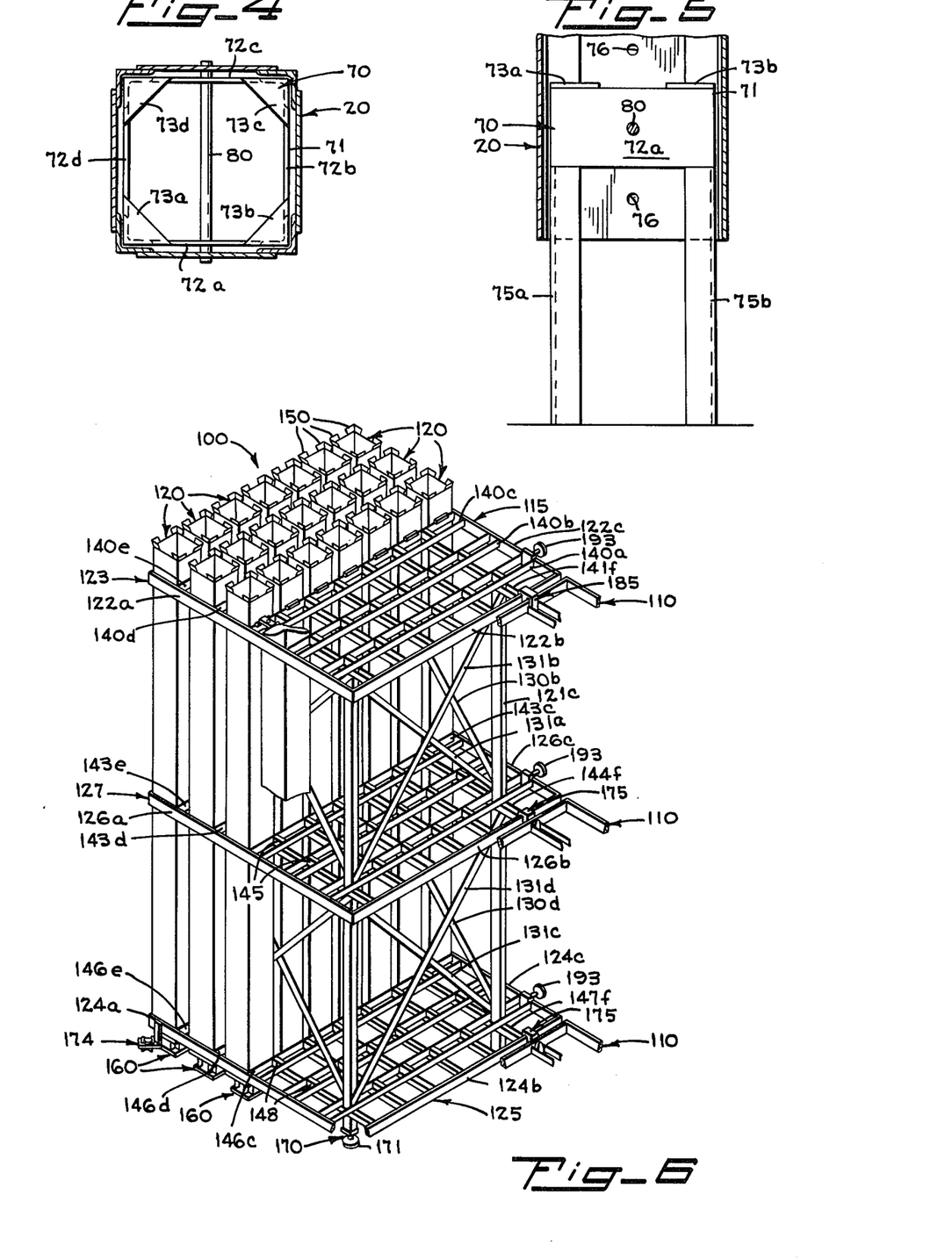
FIG. 4 is an enlarged plan view of a support for each of the fuel elements of the spent fuel rack shown in FIGS. 1-3 with an associated enclosure attached thereto shown in section.
FIG. 5 is an elevation view of the support shown in FIG. 4 with the associated enclosure attached thereto shown in section.
FIG. 6 is a fragmentary perspective view of a modification of the spent fuel rack shown in FIGS. 1-5.

According to the present invention, the spent fuel elements, not shown, contained by the enclosures 20, respectively, in upright positions are supported individually by supports 70, which rest on the pool floor (FIGS. 2 and 3). Each adjustable support 70 comprises a base 71 (FIGS. 4 and 5). Each base 71 includes a quadrature of upright walls 72a–72d. Welded to the upper surfaces of the walls 72a–72d are traingularly-shaped, horizontally disposed corner pieces 73a–73d. The bottoms of the spent fuel elements rest on the bases 71, respectively, and particularly the corner pieces 73a–73d thereof. Each base 71 is supported by four legs 75a–75b, which are welded to the bottom of the upright walls 72a–72d.

Through this arrangement, each spent fuel element transmits its load directly to the floor of the pool through its associated adjustable support 70. The rack 10 merely retains the fuel element in its upright position.

For locking the support 70 to its associated enclosure 20, aligned openings are formed in walls 72a and 72c of the support 70 and in confronting walls of the enclosure 20 which receive a locking pin 80 (FIGS. 4 and 5). Vertical spaced openings 76 of the enclosure 20 enable the support 70 to be held at an adjusted height.

Figure 7:
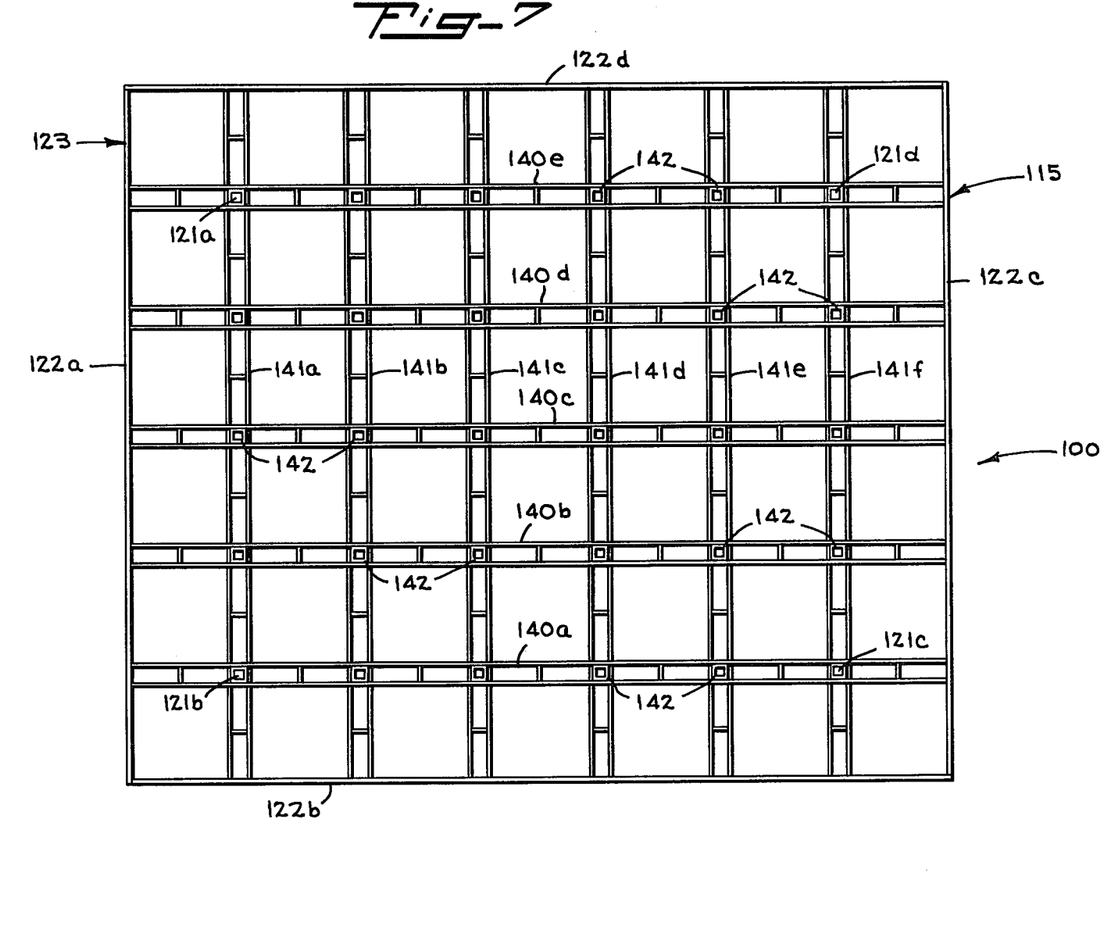
FIG. 7 is a plan view of the spent fuel rack shown in FIG. 6.

Illustrated in FIGS. 6–9 is a rack 100, which is a modification of the rack 10 shown in FIGS. 1∝3. The rack 100 comprises an open rack stainless steel frame 115 and upright stainless steel enclosures 120, in which spent fuel elements are respectively disposed. The enclosures 120 provide a shroud around the spent fuel elements to reduce the center-to-center fuel spacing. In the exemplary embodiment, there are seven parallel rows of the upright enclosures 120 and seven columns of aligned upright enclosures 120, as shown in FIG. 7.

The open rack frame 115 comprises upright members 121a–121d (FIGS. 6–9) located in the vicinity of the four corners of the frame 115. At the top of the upright members 121a–121d are disposed bars 122a–122d to form a horizontally disposed rectangularly-shaped top 123. At the lower portion of the members 121a–121d are disposed bars 124a–124d to form a horizontally disposed rectangularly-shaped base 125, which is parallel with and aligned with the top 123. Midway between the top 123 and the base 125 are disposed bars 126a–126d. The bars 126a–126d are horizontally disposed to form an intermdiate rectangular structure 127, which is parallel with and aligned with the top 123 and the base 125.

Confronting, parallel, diagonal braces 130a–130d (FIGS. 6 and 8) interconnect the top 123 with the intermediate structure 127. The braces 130a–130d are welded to the upright members 121a–121d for bracing each side of the frame 115. Likewise, confronting, parallel, diagonal braces 131a–131d (FIGS. 6 and 9) interconnect the base 125 with the intermediate structure 127. Th braces 131a–131d are welded to the upright members 121a–121d for bracing each end of the frame 115.

To form the cavities for receiving the enclosures 120, respectively, the top 123 (FIG. 7) is formed with an array of parallel, longitudinally and horinzontally disposed members 140a–140e. The longitudinal members 140a–140e are welded to the bars 122a and 122c. Additionally, each longitudinal member 140a–140e is formed with a pair of transversely spaced bars. Below the longitudinal members 140a–140e is disposed an array of parallel, transversely and horizontally disposed members 141a–141f, which are welded to the bars 122b and 122d. Each transverse member141a–141f is formed with a pair of longitudinally spaced bars. The transverse members 141a–141f are at right angles to the longitudinal members 140a–140e. The upright members 121a–121d are welded to the longitudinal members 140a and 140e and the transverse members 141a and 141f. Suitable rigidifying blocks 142 (FIGS. 6 and 7) are welded between pairs of bars of longitudinal members 140a–140e and to the pairs of bars of the transverse members 141a–141f at the cross-over junctions between the longitudinal members 140a–140e and the transverse members 141a–141f.

In a similar manner, the intermediate rectangular structure 127 (FIG. 6) is formed with an array of parallel, longitudinal and horizontally disposed members 143a–143e. The longitudinal members 143a–143e are welded to the bars 126a and 126c. Additionally, each longitudinal member 143a–143e is formed with a pair of transversely spaced bars. Below the longitudinal members 143a–143e is disposed an array of parallel, transversely and horizontally disposed members 144a–144f, which are welded to the bars 126b and 126d. Each transverse member 144a–144f is formed with a pair of longitudinally spaced bars. The transverse members 144a–144f are at right angles to the longitudinal members 143a–143e. The upright members 121a–131d are welded to the longitudinal members 143a and 143e and the transverse members 144a and 144f. Suitable rigidifying blocks 145 are welded between pairs of bars of longitudinal members 143a–143e and to the pairs of bars of the transverse members 144a–144f at the cross-over junctions between the longitudinal members 143a–143e and the transverse members 144a–144f. The longitudinal members 143a–143e are aligned with and in parallel relation with the longitudinal members 140a–140e, respectively. Likewise, the transverse members 144a–144f are aligned with and in parallel relation with the transverse members 141a–141e, respectively.

Likewise, the base 125 is formed with an array of parallel, longitudinal and horizontally disposed members 146a–146e. . The longitudinal members 146a–146e are welded to the bars 122a and 122c. Additionally, each longitudinal member 146a–146e is formed with a pair of transversely spaced bars. Below the longitudinal members 143a–143e is disposed an array of parallel, transversely and horizontally disposed members 147a–147f, which are welded to the bars 122b and 122d. Each transverse member 147a–147f is formed with a pair of longitudinally spaced bars. The transverse members 147a–147f are at right angles to the longitudinal members 146a–146e. The upright members 121a–131d are welded to the longitudinal members 146a and 146e and the transverse members 147a and 147f. Suitable rigidifying blocks 148 are welded between pairs of bars of longitudinal members 146a–146e and to the pairs of bars of the transverse members 147a–147f at the cross-over junctions between the longitudinal members 146a–146e and the transverse members 147a–147f. The longitudinal members 146a–146e are aligned with and in parallel relation with the longitudinal members 140a–140e and 143a–143e, respectively. Similarly, the transverse members 147a–147e are aligned with and in parallel relation with the transverse members 141a–141e and 144a–144e, respectively.

Disposed in the aligned square openings of the top 123, the intermediate structure 127 and the base 125 are the respective upright enclosures 120 (FIGS. 6, 8 and 9) with square cross-sectional areas. The stainless steel enclosures 120 are not only structurally rigid but also provide sufficient neutron absorption cross-section to allow close spacing of the spent fuel elements. In the exemplary embodiment, each enclosure 120 is 9 × 9 inches inside cross-sectional dimension and each enclosure 120 is ⅛ inch or ¼ inch thick 304 stainless steel. The center-to-center spacing for the openings receiving the enclosures 120 is 14 inches × 12 inches. Preliminary calculations suggest that this arrangement will produce a $K_{eff}$ of $0.90 \pm 2\%$.

The upper portion of each upright enclosure 120 has fuel element lead-in guides 150 (FIGS. 6, 8 and 9) at the four corners thereof to assist in placing fuel elements into the enclosures 120. Hold down fasteners 151 (FIGS. 8 and 9) secure the enclosures 120 to the transverse members 140a–140e of the open rack frame 115. The hold down fasteners 151 engage flanges 152 extending from the walls of the enclosures 120 and lock through a bolt to the transverse member of the top 123 for holding downwardly the enclosures 120 in a fixed position. Thus, the enclosures 120 are locked down to the rack 110 with the locking device 151.

Figure 8:
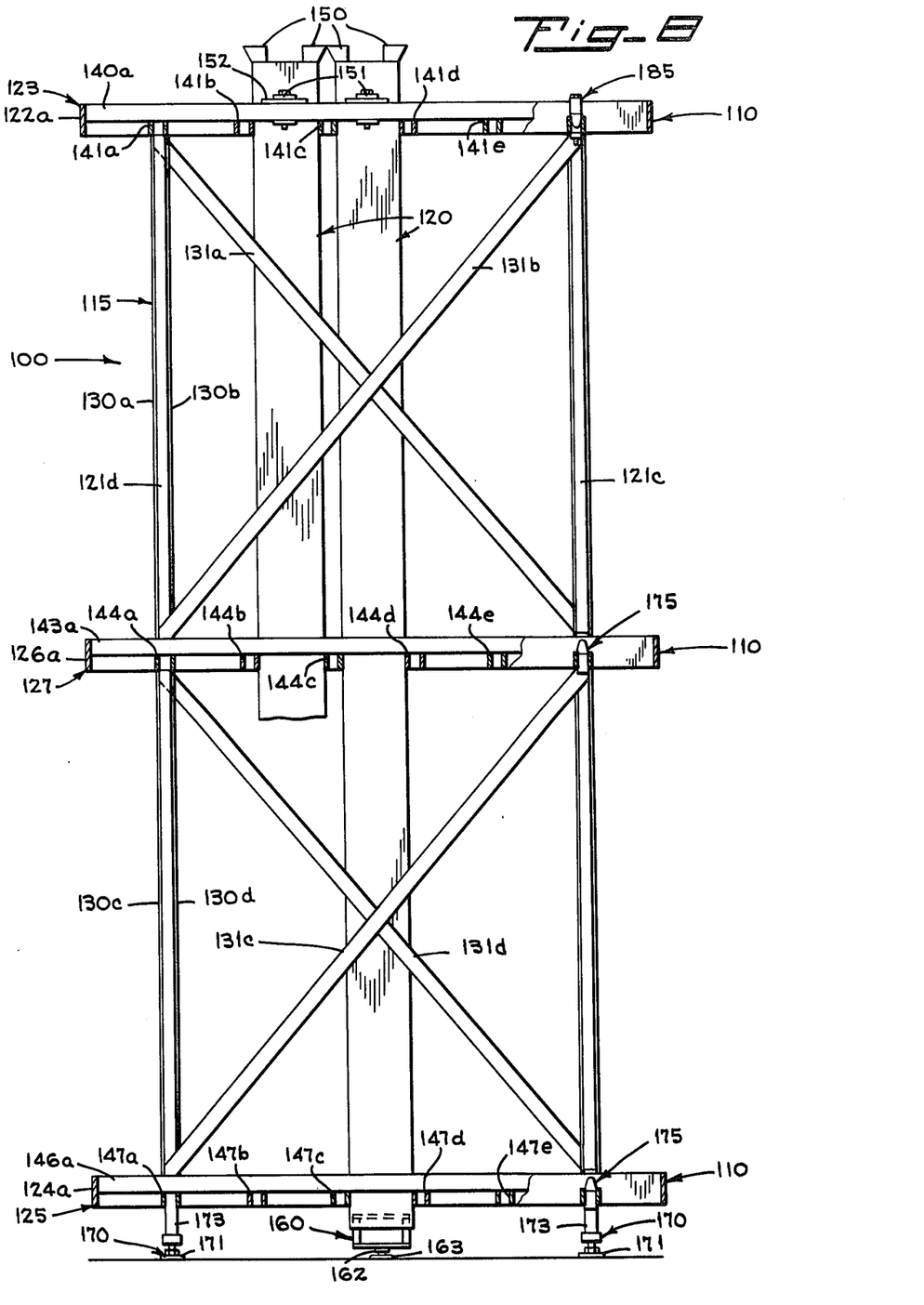
FIG. 8 is a fragmentary side elevation view of the spent fuel rack shown in FIG. 6.
Figure 9:
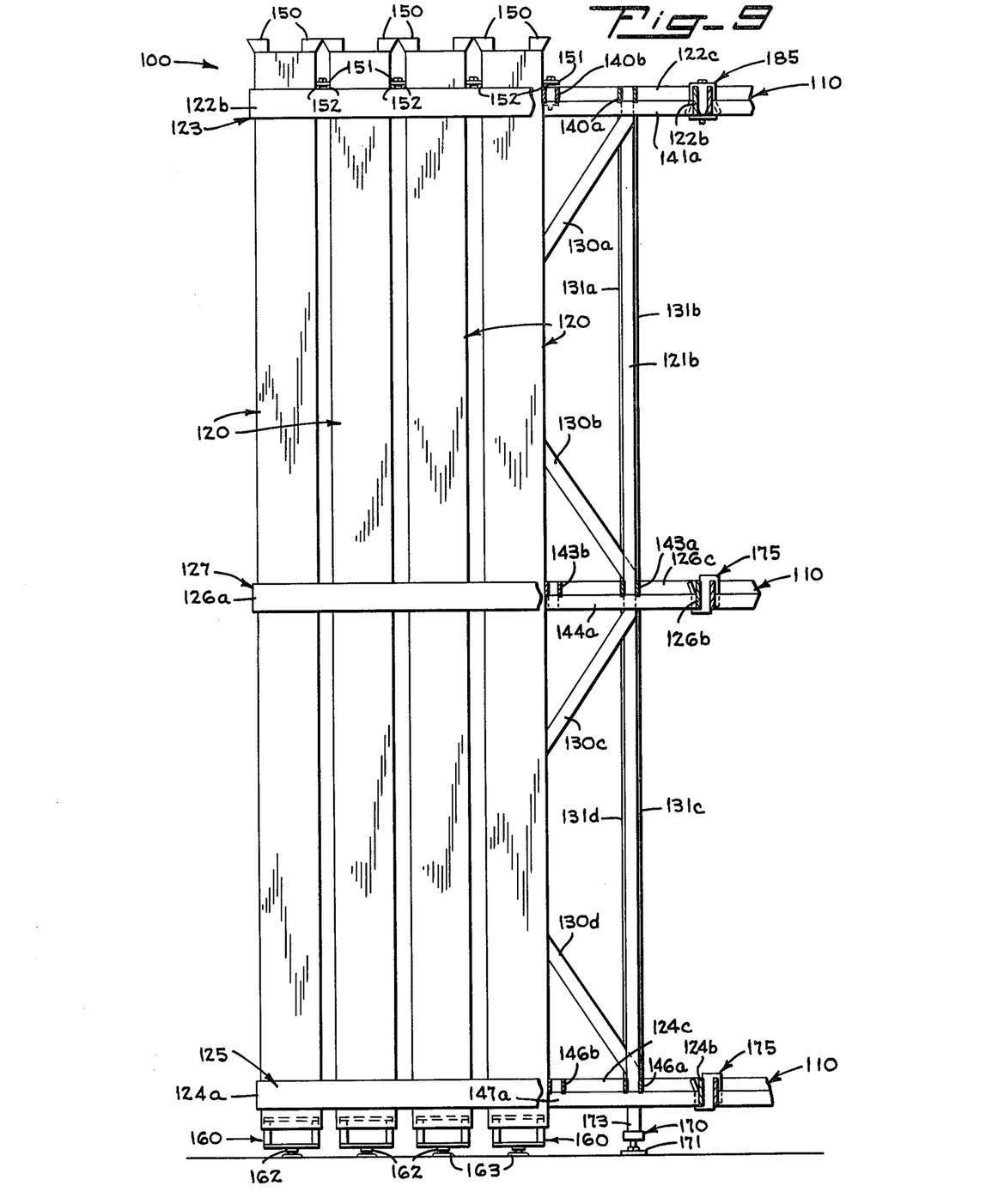
FIG. 9 is fragmentary and elevation view of the spent fuel rack shown in FIG. 6.

According to the present invention, the spent fuel elements, not shown, contained by the enclosures 120, respectively, in upright positions are supported individually by self-aligning supports 160 (FIGS. 6, 8 and 9). By virtue of the self-aligning supports 160, the load of the spent fuel elements is transmitted to the floor of the pool through the self-aligning supports 160. The load of the spent fuel elements is not imparted to the rack 100. The open rack frame 115 merely retains the fuel elements in the upright position. Through this arrangement, the undesirable aspects of an uneven pool floor are obviated. Thus, each spent fuel element is supported by the pool floor on a self-leveling support.

Figures 10, 11, 12:
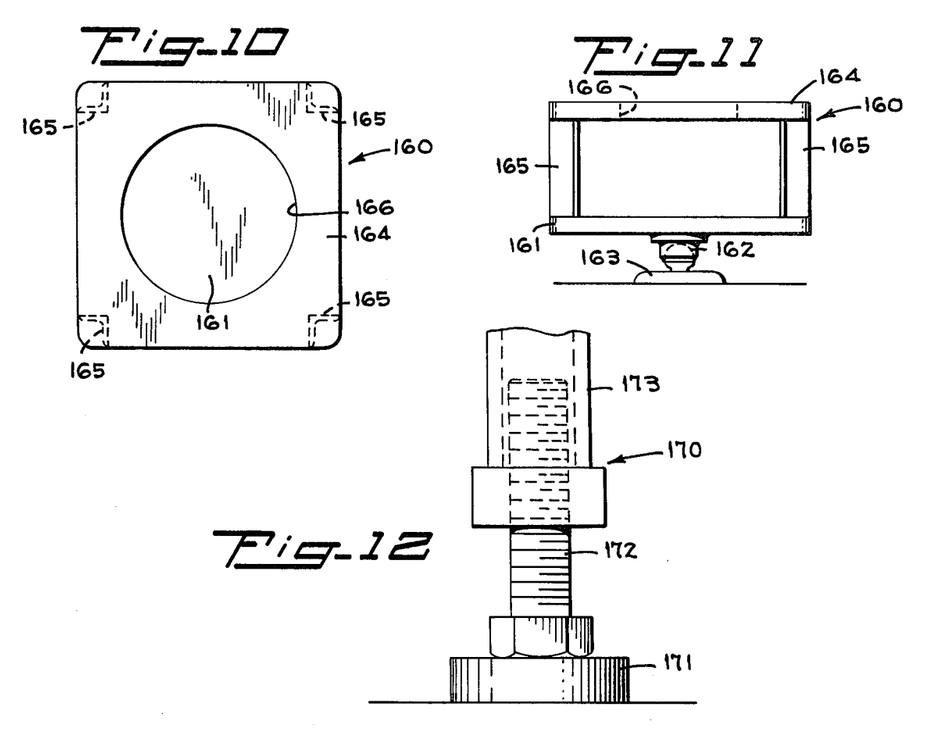
FIG. 10 is an enlarged plan view of a support for each of the fuel elements of the spent fuel rack shown in FIGS. 6-9.
FIG. 11 is an elevation view of the adjustable support shown in FIG. 10.
FIG. 12 is an enlarged elevation view of an adjustable support for the open rack frame of the rack shown in FIGS. 6-9.

Each self-aligning support 160 (FIGS. 10 and 11) comprises a base 161. Mounted on the base 161 in a conventional manner is a suitable swivel or ball joint 162 (FIG. 11). The stationary part of the ball joint 162 is fixed to the base 161. The movable part of the swivel joint 162 is fixed to a bottom plate 163 for movement therewith. The bottom plate 163 rests on the floor of the pool. Spaced from the bottom plate 163 in the vertical direction is a top plate 164. Disposed in fixed relation to the top plate 164 and the bottom plate 163 are four connecting angle members 165. The top plate 164, the bottom plate 163 and the members 165 move in unison with the movable part of the swivel joint 162. A central opening 166 is formed in the top plate 164. Seated on the top plate 164 is an upright spent fuel element. The enclosure 120 extends below the top plate 164 as shown in FIGS. 8 and 9. Thus, the spent fuel elements by virtue of the self-aligning support 160 will assume an upright position on a pool floor that may have an uneven surface.

The open rack frame 115 is provided with adjustable legs at the four corner portions thereof (FIGS. 6, 8 and 9). Toward this end, adjustable frame supports 170 are disposed below the upright members 121a–121d, respectively. Each support 170 (FIG. 12) comprises a base 171 that rests on the floor of the pool. Fixed to the base 171 is an upright threaded post 172. An internally threaded column 173 is in threaded engagement with the post 172. Rotation of the column 173 about fixed post 172 raises or lowers the column 173. Seated on the column 173 in an upright member, such as upright members 121a–121d. Thus, the supports or legs 170 may be adjusted to maintain the rack 110 level and stable, although the floor of the pool may be uneven.

The spent fuel rack 100 is secured to the floor of the pool by bolts and plates 174 in a conventional and well-known manner (FIG. 6). For securing adjacent spent fuel racks together, such as spent fuel racks 100 and 100A shown in FIGS. 6 and 9, Z-rack connectors 175 (FIG. 13) are employed. The Z-rack connectors 175 obviate the need for welding and bolting but, yet, provide a rigid, stable rack structure. The Z-rack connectors 175 are connected to the members 126b and 124b of the intermediate structure 127 and the base 125, respectively, and to the corresponding members of the adjacent rack 100A. In the exemplary embodiment, the adjacent rack 100A is similar in construction to the spent fuel rack 100.

Figure 13:
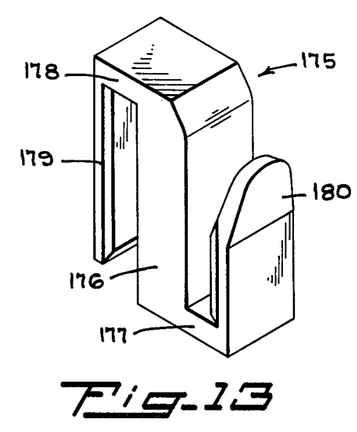
FIG. 13 is a perspective of a Z-rack connector for securing together contiguous racks.

Each Z-rack connector 175 comprises a body 176. Extending from opposite ends of the body 176 are parallel spacer member 177 and 178, which are integral with and at right angles to the body 176. Projecting from the free end of the spacer member 178 is a connector arm 179 that is integrally formed with the spacer member 178 and parallel to the body 176. The rack members, such as the members 126b and 124b are respectively embraced or gripped by its associated Z-rack connector 175 by being received in the space defined by the body 176, connector arm 179, and spacer member 178. Projecting from the free end of the spacer member 177 is a connector arm 180 that is integrally formed with the spacer member 178 and parallel to the body 176. The connector arm 180 is oppositely directed relative to the connector arm 175. The free end of the connector arm 180 is directed at an angle away from the body 176 to facilitate the entry of the gripped members of the rack 110. The members, such as the members of rack 110 corresponding to the members 126b and 124b of the rack 100, are embraced or gripped respectively by its associated Z-rack connector 175 being received in the space defined by the body 176, connector arm 180 and the spacer member 177.

Figure 14:
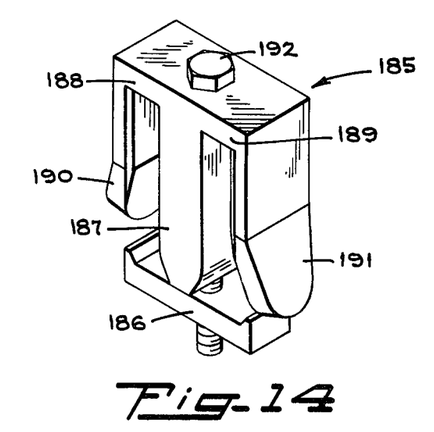
FIG. 14 is a perspective view of an E-rack connector for securing together contiguous racks.

Illustrated in FIG. 14 is an E-rack connector 185 for securing together adjacent spent fuel racks, such as spent fuel racks 100 and 110 shown in FIGS. 6 and 9. The E-rack connector 185 obviates the need for welding and bolting but yet provides a rigid, stable rack structure. The E-rack connector 185 is connected to the member 122b of the top 123 and to the corresponding member of the adjacent rack 110.

Each E-rack connector 185 comprises a clamp plate or nut 186 which underlies the member 122b and the corresponding member of the rack 110. Formed in the clamp plate or nut 186 is a central threaded opening. Above the clamp plate or nut 186 is disposed a body member 187 formed with a base therethrough. Projecting from one end of the body member 187 at right angles thereto and in opposite directions are integrally formed space members 188 and 189. Extending from the free ends of the spacer members 188 and 189, respectively, in parallel relation with the body member 187 and toward the clamp plate or nut 186 are connector arms 190 and 191. The connector arms 190 an 191 are integrally formed with the spacer members 188 and 189, respectively. The free ends of the connector arms 190 and 191 are flared outwardly from the body member 187 to facilitate the entry of the members of the racks 100 and 110 to be gripped. A bolt 192 is received by the longitudinal base of the body member 187 and threaded to the clamp plate or nut 186 to draw the clamp plate 186 toward the flared free ends of the connector arms 190 and 191. The member 122b of the rack 100 and the corresponding member of the adjacent rack 110 are clamped or gripped by the E-rack connector 185. In so doing, the member 122b of the rack 100 is disposed in the space defined by the connector arm 190, the spacer member 188, the body member 187 and the clamp plate 186. The corresponding member of the adjacent rack 110 is disposed in the space defined by the connector arm 191, the spacer member 189, the body member 187 and the clamp plate 186.

To conform to the seismic criteria, the rack 100 is laterally braced at the top 123 and at the intermediate structure 127 from the wall of the pool by adjustable jacks, such as jacks 193 in a well-known and conventional manner.

We claim:

1. A rack for spent nuclear fuel elements comprising:
   a. a frame;
   b. enclosures for containing respectively spent nuclear fuel elements, said enclosures being supported by said frame in an upright position; and c. a support for each of said enclosures resting on a supporting surface and disposed below the fuel element contained by the associated enclosure for supporting the load of the fuel element while the associated enclosure retains the fuel element in an upright position.

2. A rack as claimed in claim 1 wherein said enclosures are fixed to said frame.

3. A rack as claimed in claim 1 wherein each of said supports comprises:
   a. a base on which rests an associated fuel element; and
   b. legs connected to its associated base and disposed on a supporting surface for supporting the associated base.

4. A rack as claimed in claim 3 wherein each base is attached to its associated enclosure.

5. A rack as claimed in claim 4 and comprising legs disposed below said frame in the vicinity of the corners thereof for supporting said frame.

6. A rack as claimed in claim 5 wherein each of said enclosures includes a flared opening at the top thereof to guide the entry of the nuclear fuel element contained therein.

7. A rack as claimed in claim 1 wherein each of said supports includes means for self-alignment to accommodte an uneven supporting surface while supporting the fuel element in the upright position.

8. A rack for spent nuclear fuel elements comprising:
   a. a frame;
   b. enclosures for containing respectively spent nuclear fuel elements, said enclosures being supported by said frame in an upright position; and
   c. a support for each of said enclosures resting on a supporting surface and disposed below the fuel element contained by the associated enclosure for supporting the load of the fuel element while the associated enclosure retains the fuel element in an upright position, each of said supports comprising:
      a. a first base on which rests an associated fuel element; and
      b. swivel means connected to its associated first base and disposed on a supporting surface to support the associated first base for self-aligning movement to accommodate an uneven supporting surface while supporting the fuel element in the upright position.

9. A rack as claimed in claim 8 wherein said swivel means comprises:
   a. a second base resting on the supporting base; and
   b. a swivel joint with a stationary part fixed to said second base and a movable part connected to said first base for movement therewith.

10. A rack as claimed in claim 7 and comprising legs resting on a supporting surface and disposed below said frame in the vicinity of the corners thereof for supporting said frame.

11. A rack for spent nuclear fuel elements comprising:
   a. a frame;
   b. enclosures for containing respectively spent nuclear fuel elements, said enclosures being supported by said frame in an upright position;
   c. a support for each of said enclosures resting on a supporting surface and disposed below the fuel element contained by the associated enclosure for supporting the load of the fuel element while the associated enclosure retains the fuel element in an upright position, each of said supports including means for self-alignment to accommodate an uneven supporting surface while supporting the fuel element in the upright position; and
   d. legs resting on a support surface and disposed below said frame in the vicinity of the corners thereof for supporting said frame, each of said legs for said frame including means for adjusting the height thereof.

12. A rack as claimed in claim 7 wherein each of said enclosures includes a flared opening at the top thereof to guide the entry of the nuclear fuel element contained therein.

13. A rack as claimed in claim 2 and comprising a rack-to-rack connector attached to said frame for securing an adjacent frame thereto.

14. A rack for spent nuclear fuel elements comprising:
   a. a frame;
   b. enclosures for containing respectively spent fuel elements, said enclosures being supported by said frame in an upright position, said enclosures being fixed to said frame;
   c. a support for each of said enclosures resting on a supporting surface and disposed below the fuel element contained by the associated enclosure for supporting the load of the fuel element, while the associated enclosure retains the fuel element in an upright position; and
   d. a rack-to-rack connector attached to said frame for securing an adjacent frame thereto, said connector comprising:
      a. a body;
      b. a first spacer member projecting from one end portion of said body;
      c. a second spacer member projecting from another end portion of said body in a direction opposite from the direction of projection of said first spacer member;
      d. a first connector arm projecting from said first spacer member in a direction generally parallel with said body for gripping said frame between said first connector arm and said body; and
      e. a second connector arm projecting from said second spacer member in a direction generally parallel with said body and oppositely directed with respect to said first connector arm for gripping the frame of an adjacent rack between said second connector arm and said body.

15. A rack for spent nuclear fuel elements comprising:
   a. a frame;
   b. enclosures for containing respectively spent fuel elements, said enclosures being supported by said frame in an upright position, said enclosures being fixed to said frame;
   c. a support for each of said enclosures resting on a supporting surface and disposed below the fuel element contained by the associated disclosure for supporting the load of the fuel element, while the associated enclosure retains the fuel element in an upright position; and
   d. a rack-to-rack connector attached to said frame for securing an adjacent frame thereto, said connector comprising:
      a. a body formed with a bore therethrough;
      b. a first spacer member projecting from one end portion of said body;
      c. a second spacer member projecting from said one end portion of said body in a direction opposite from the direction of projection of said first spacer member;

d. a first connector arm projecting from said first spacer member in the general direction of said bore;

e. a second connector arm projecting from said second spacer member in the general direction of said bore;

f. a bolt extending through said bore and beyond said body; and g. a clamp with a threaded opening aligned with the bore of said body, said clamp being formed with wings extending toward the free ends of said first and second connector arms, said clamp being in threaded engagement with said bolt and being adapted to be drawn toward said first and second connector arms and said body by said bolt, said frame being gripped between the space defined by said first connector arm, said first spacer member, said body and said clamp, said second connector arm, said second spacer member, said body and said clamp being arranged to grip the frame of an adjacent rack.

16. A rack as claimed in claim 7 wherin each of said enclosures is bolted to said frame.

* * * * *